(12) United States Patent
Sydnor

(10) Patent No.: US 10,107,253 B2
(45) Date of Patent: Oct. 23, 2018

(54) METHODS AND APPARATUS FOR TEST A PERFORMANCE OF A GENERATOR

(71) Applicant: The Boeing Company, Chicago, IL (US)

(72) Inventor: Bryan Sydnor, Long Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 514 days.

(21) Appl. No.: 14/845,942

(22) Filed: Sep. 4, 2015

(65) Prior Publication Data
US 2017/0067963 A1 Mar. 9, 2017

(51) Int. Cl.
*F03B 11/00* (2006.01)

(52) U.S. Cl.
CPC ......... *F03B 11/008* (2013.01); *F05B 2260/83* (2013.01); *Y02E 10/226* (2013.01)

(58) Field of Classification Search
CPC .. G01R 31/343; F03B 11/008; F05B 2260/83; Y02E 10/226
See application file for complete search history.

(56) References Cited

U.S. PATENT DOCUMENTS

| 7,471,009 | B2 | 12/2008 | Davis et al. | |
| 2010/0314885 | A1* | 12/2010 | Presz, Jr. | ........... F03D 1/04 290/55 |
| 2010/0327591 | A1 | 12/2010 | Dick et al. | |
| 2011/0293404 | A1 | 12/2011 | Hamad et al. | |
| 2013/0333478 | A1* | 12/2013 | Jensen | ........... G01M 7/02 73/662 |
| 2015/0357951 | A1* | 12/2015 | Han | ........... H02P 9/02 290/43 |

* cited by examiner

*Primary Examiner* — Yoshihisa Ishizuka
(74) *Attorney, Agent, or Firm* — Hanley, Flight & Zimmerman, LLC

(57) ABSTRACT

Methods and apparatus to test a generator of a hydrokinetic turbine are disclosed herein. An example method includes positioning a rim generator of a hydrokinetic turbine assembly on a testing apparatus prior to assembling the rim generator with the hydrokinetic turbine; orienting a rotational axis of the rim generator substantially vertically; and measuring a first output performance of the rim generator.

21 Claims, 5 Drawing Sheets

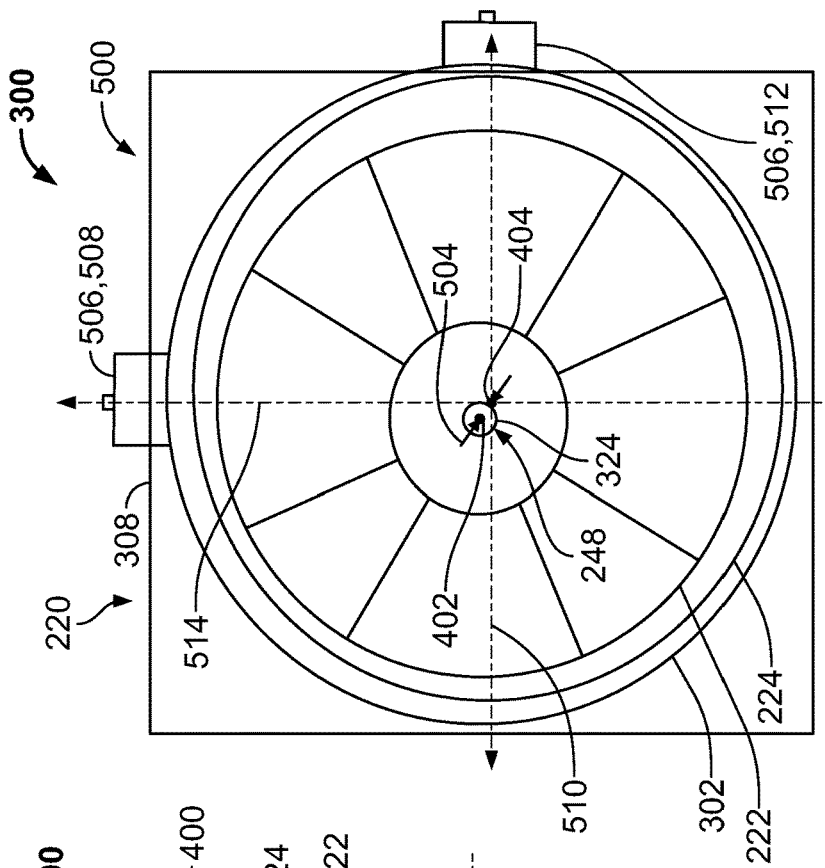
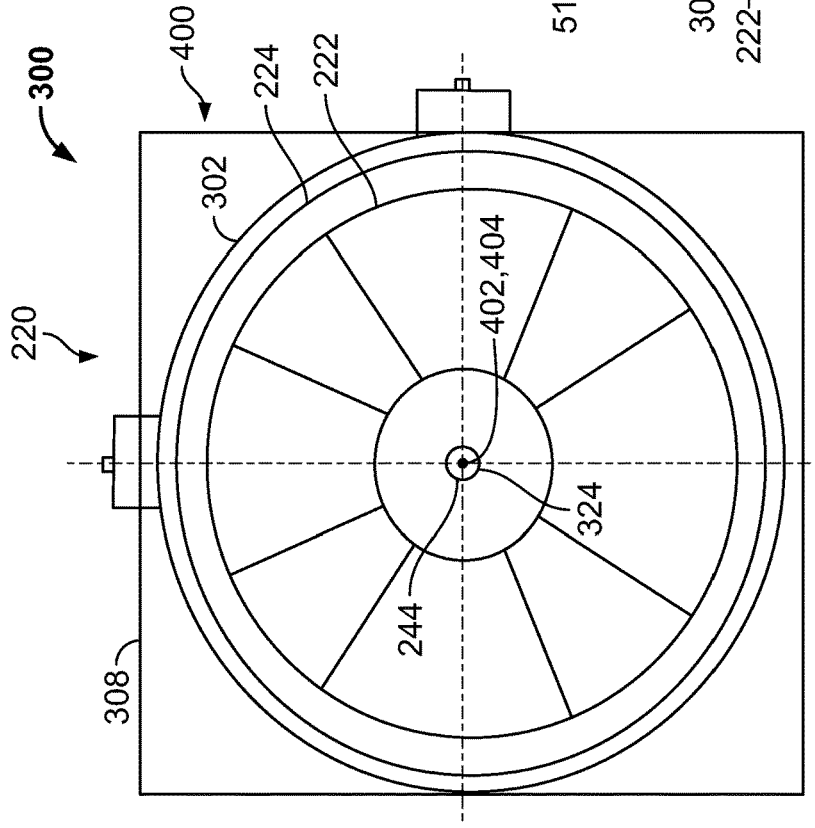

US 10,107,253 B2

METHODS AND APPARATUS FOR TEST A PERFORMANCE OF A GENERATOR

FIELD OF THE DISCLOSURE

This patent relates generally to generators and, more particularly, to methods and apparatus to test a performance of a generator.

BACKGROUND

Hydrokinetic turbines capture energy from a flow of water to drive a generator to generate electricity without requiring the building of, for example, dams. Thus, hydrokinetic turbines provide a relatively low-cost means of generating electricity with minimal impact to the environment.

SUMMARY

An example method includes positioning a rim generator of a hydrokinetic turbine assembly on a testing apparatus prior to assembling the rim generator with the hydrokinetic turbine; orienting a rotational axis of the rim generator substantially vertically; and measuring a first output performance of the rim generator.

Another example method includes orientating a longitudinal axis of a rim generator vertically relative to ground prior to assembling the rim generator with a hydrokinetic turbine assembly; driving the rim generator via a drive system; and measuring a first output performance of the rim generator.

Another example method includes positioning a rim generator on a platform of a testing apparatus, where the rim generator has a rotor and a stator; aligning a longitudinal axis of the rotor and a longitudinal axis of the stator in a vertical orientation relative to the platform; coupling a shaft to the rotor via an opening in the platform; moving the longitudinal axis of the rotor relative to the longitudinal axis of the stator via a slider system of the platform; rotating the rotor relative to the stator via a drive system and the shaft; and measuring a first output performance of the rim generator.

BRIEF DESCRIPTION OF THE DRAWINGS

FIG. 4 is a partial plan view of the example rim generator positioned on the testing station of FIG. 3 in a first position.

FIG. 5 is another partial plan view of the example the generator positioned on the testing station of FIG. 3 in a second position.

The FIGURES are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

Figure 1:
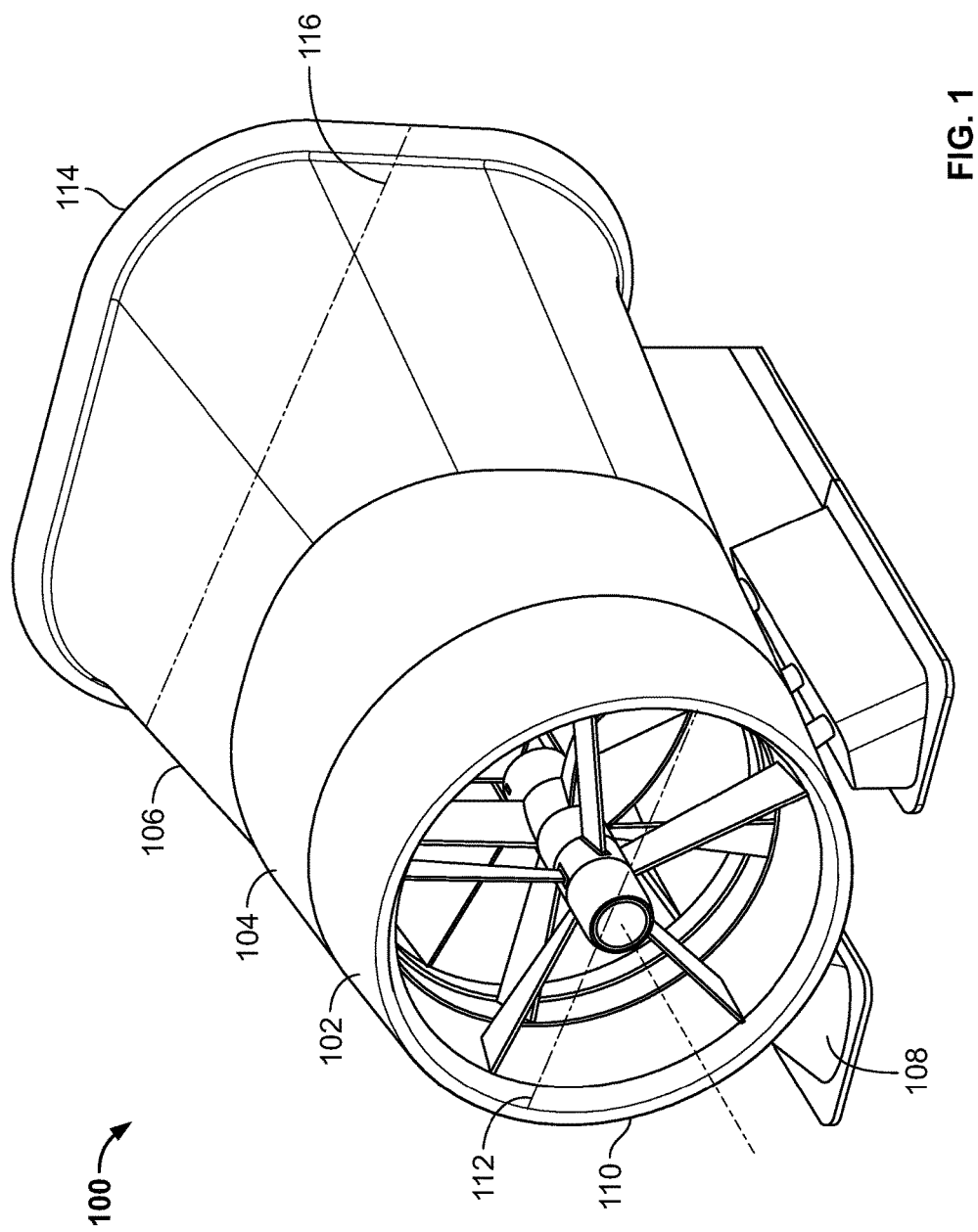
FIG. 1 is an example hydrokinetic turbine constructed in accordance with the teachings disclosed herein.

Hydrokinetic turbines convert kinetic energy from flowing water into mechanical energy to rotate a shaft of a generator to create electrical energy. The electrical energy output of the hydrokinetic turbine determines a power output rating of the hydrokinetic turbine. In particular, a hydrokinetic turbine typically includes a rim generator that is driven via flowing water that generates electrical energy or power output of the hydrokinetic turbine. The rim generator often includes a rotor that rotates relative to a fixed stator about a rotational axis to rotate a magnet coupled to the rotor about a copper material positioned on the stator.

Typically, a power output rating of the hydrokinetic turbine is determined by testing a fully assembled hydrokinetic turbine prior to installing the hydrokinetic turbine in an operating environment (e.g., a body of water, a river, etc.). For example, a fully assembled hydrokinetic turbine is tested to ensure an output performance of the rim generator meets or complies with an expected power output performance of the hydrokinetic turbine. Testing of a fully assembled hydrokinetic turbine assembly is often performed with the axis of rotation of a rim generator or, more generally, the hydrokinetic turbine in a substantially horizontal orientation or position.

Such known testing methods of testing a fully assembled hydrokinetic turbine with a longitudinal axis in a horizontal orientation typically require the hydrokinetic turbine to be in a final assembled state prior to submerging the turbine assembly in a body of water. As a result, such testing methods often require the hydrokinetic turbine assembly to be structurally sufficient to withstand external driving loads and/or other forces required to test the turbine assembly in a test environment as opposed to an operational environment (e.g., water). More specifically, the loads imparted to the turbine assembly in a test environment (e.g., outside of a body of water) may be greater and/or different than the loads imparted to the turbine assembly in the intended operational environment (e.g., inside a body of water).

In particular, factors such as shaft sag, bearing loads, shaft seals, friction etc., may be different (e.g., greater) in a testing environment than in an operational environment. For example, a fully assembled turbine assembly may experience shaft sag, which greatly impacts power output efficiencies of the hydrokinetic turbine assembly. Shaft sag may be reduced in an operational environment relative to a testing environment due to buoyancy effect. To address the shaft sag being greater in a test environment than in an operational environment, many turbine assemblies are manufactured with a shaft having a greater diameter to accommodate the loads in the testing environment, thereby increasing manufacturing costs.

In some instances, in a testing environment, a motor is employed to rotate a shaft of a rim generator and, thus, the shaft is often configured to carry a drive load or torque imparted by the motor when the hydrokinetic turbine axis of rotation is in a horizontal orientation. However, in an operating environment, water flow imparts a load to the blades of the rim generator to rotate the shaft. Thus, in an operating environment, the blades of the rim generator carry a drive load, and the shaft only reacts to drag torque of bearings that support the shaft. As a result, an external drive torque imparted to a shaft of the hydrokinetic turbine assembly via a motor (e.g., during testing) may be greater than a reaction drag torque imparted to the shaft via the bearings when water flow turns the blades of the hydrokinetic turbine assembly. As a result, testing performed on a fully assembled hydrokinetic turbine in a test environment often requires an entire drive train (e.g., shaft, bearings, mechanical seals, etc.) to be configured to support the increased loads imparted to the hydrokinetic turbine assembly in the testing environment relative to the loads the hydrokinetic turbine assembly would otherwise experience in an operational environment. Thus, such testing methods may needlessly increase the costs (e.g., manufacturing costs, material costs, etc.) of the hydrokinetic turbine assembly for the sole purpose of testing and/or verifying a power output rating of the turbine assembly.

The example methods and apparatus disclosed herein enable testing of a portion of a hydrokinetic turbine prior to fully assembling the hydrokinetic turbine assembly. More specifically, the example methods and apparatus disclosed herein enable testing performance of a rim generator portion of the hydrokinetic turbine assembly without other components (e.g., an intake portion, intake vanes or blades, a shroud, etc.) being attached or assembled to the rim generator. In this manner, the example methods and apparatus disclosed herein isolate mechanical losses of a hydrokinetic turbine assembly (e.g., bearings, seals, etc.) when testing a performance of a generator. As a result, components (e.g., shaft size or diameter, seals, bearings, drive train components, etc.) of the example hydrokinetic turbine assembly can be manufactured based on operational conditions rather than testing conditions, thereby reducing the manufacturing costs.

The methods and apparatus disclosed herein provide a substantially horizontal testing station or apparatus to support a rim generator subassembly of a hydrokinetic turbine assembly. More specifically, the horizontal testing station enables a rotational axis of the rim generator to be positioned in a substantially vertical orientation or direction relative to the testing station. For example, by orientating the axis of rotation of the rim generator in a vertical orientation, loads due to shaft sag, bearings, seals, etc., are eliminated or minimized and do not affect testing performance of the rim generator. As a result, shaft sag can be eliminated or minimized from the performance testing of the rim generator. Such testing performed on only the rim generator portion of a hydrokinetic turbine assembly in a test environment does not require an entire drive train (e.g., shaft, bearings, mechanical seals, etc.) to be configured to support loads that would otherwise be imparted to the turbine assembly in the testing environment, resulting in reduced manufacturing costs. In some examples, the methods and apparatus disclosed herein enable emulation of shaft sag during performance testing to determine if a diameter of the shaft can be reduced to further reduce manufacturing costs.

FIG. 1 is an example hydrokinetic turbine assembly 100 that may generate electrical power using natural water movement without requiring use of dams and/or diversions. The example hydrokinetic turbine assembly 100 may be used in a body of water such as an ocean, a lake, a river, a stream, etc. The example hydrokinetic turbine assembly 100 includes an intake 102, a generator 104 and a shroud 106. To install the hydrokinetic turbine assembly 100 in a body of water such as a river, the intake 102, the generator 104, and the shroud 106 are coupled (e.g., bolted) to a base 108. The intake 102 forms an inlet 110 having an inlet diameter 112 and the shroud 106 forms an outlet 114 having an outlet diameter 116.

Figure 2:
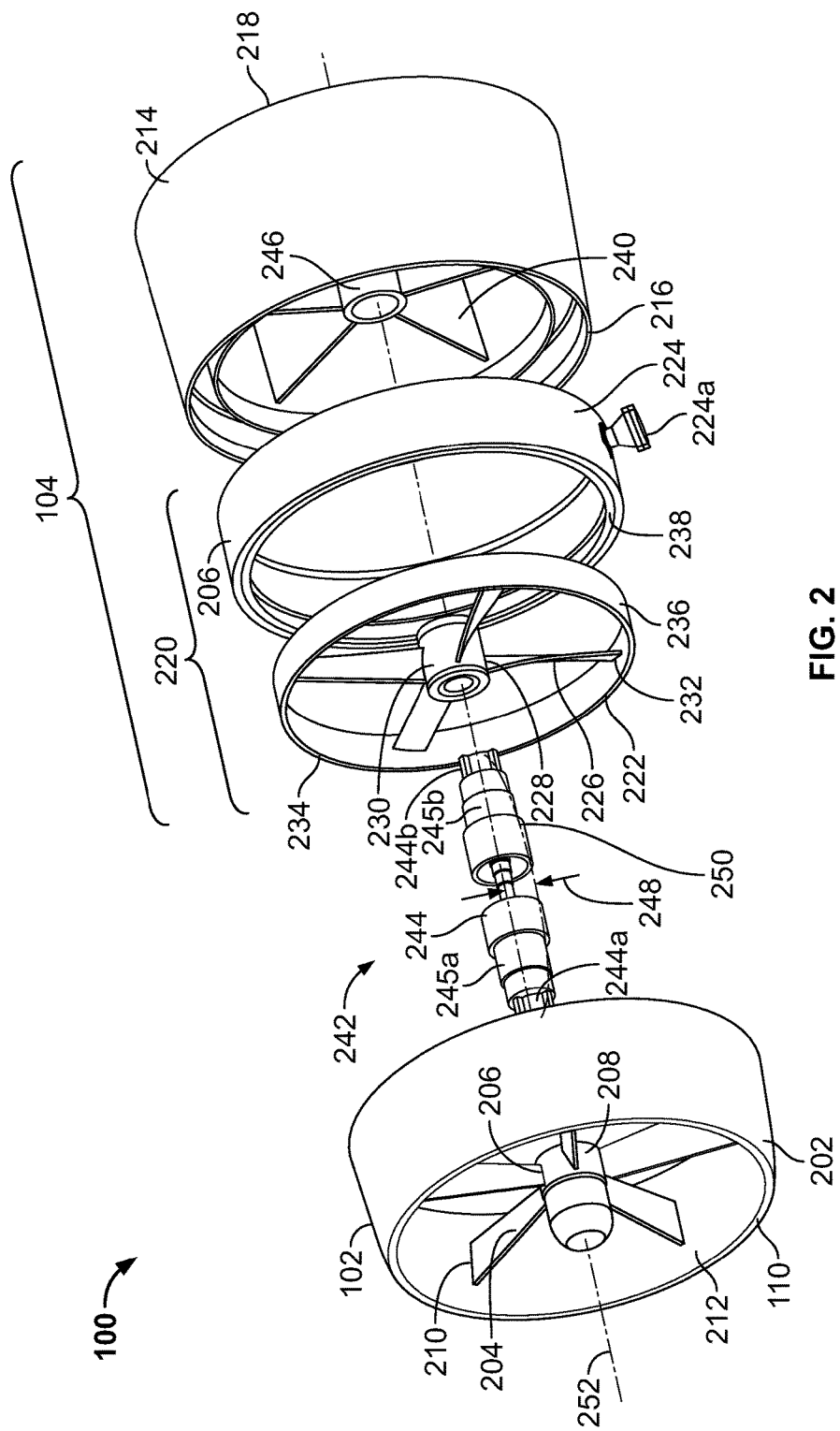
FIG. 2 is an exploded view of portions of the hydrokinetic turbine of FIG. 1.

FIG. 2 is a partial exploded view of the example hydrokinetic turbine assembly 100 of FIG. 1. The intake 102 includes an intake housing 202 defining the inlet 110. The intake 102 includes blades or intake vanes 204 (e.g., preswirl vanes or blades) positioned within the intake housing 202 adjacent the inlet 110. Each of the vanes 204 has a root end 206 coupled to a hub 208 and a distal end 210 coupled to an inner surface 212 of the intake housing 202. The generator 104 includes a generator housing 214 having a first end 216 to couple to the intake housing 202 and a second end 218 to couple to the shroud 106. The generator 104 of the illustrated example includes a rim generator 220 supported by the generator housing 214. The rim generator 220 converts rotational energy to electric energy.

The rim generator 220 of the illustrated example has a rotor 222 that moves or rotates relative to a stator 224 to generate electrical energy or power output. More specifically, the rotor 222 includes blades or vanes 226 (e.g., drive vanes) each having a root end 228 coupled to a hub 230 and a distal end 232 coupled to a support ring or rim 234 of the rotor 222. At least a portion of the rim 234 of the illustrated example includes a magnet or magnetic material 236 (e.g., positioned in a particular pattern about a circumference of the rim 234) that moves relative to a copper material or copper coils 238 of the stator 224 to generate electrical energy. The rim generator 220 produces, for example, at least 800 volts and/or has a power output performance of approximately 100 kilowatts. The stator 224 includes an electrical output connector 224a. The generator housing 214 includes stationary or fixed vanes 240 (e.g., integrally formed with the generator housing 214) to reduce a velocity and/or turbulence of the fluid flow prior to the fluid flowing through the outlet 114.

A direct drive transmission 242 enables the rotor 222 to rotate relative to the stator 224. In particular, the direct drive transmission 242 of the illustrated example includes a shaft 244 coupled to the rotor 222 without an intervening gear arrangement (e.g., a gear box). A first end 244a of the shaft 244 is rotationally supported or coupled to the hub 208 via a first bearing 245a and a second end 244b of the shaft 244 is rotationally supported or coupled to a hub 246 of the generator housing 214 via a second bearing 245b. The shaft 244 passes through and is rotatably fixed to the hub 230 of the rotor 222. In direct drive hydrokinetic turbines, the electrical energy output is directly related to the speed of rotation of the shaft 244. However, in some instances, due to for example gravity, a weight of the shaft 244, and/or a ratio between a length and a diameter of the shaft 244, the shaft 244 may bow or experience shaft sag 248 during operation. For example, factors such as stresses (e.g., stack-up stresses), temperature, manufacturing tolerances, etc., may cause shaft sag 248. The shaft sag 248 is a distance offset that corresponds to misalignment (i.e., a non-coaxial relationship) between a longitudinal axis 250 of the shaft 244 and an axis of rotation 252 of the rim generator 220 (e.g., the rotor 222 and/or the stator 224). As a result, the shaft sag 248 produces an imbalance, thereby affecting an output performance (e.g., a power output performance and/or efficiency) of the rim generator 220. Thus, material selection and/or sizing of the shaft 244 may be altered to reduce the shaft sag 248.

In operation, the hydrokinetic turbine assembly 100 may be oriented, or positioned, in a body of water such that the axis of rotation of the rotor 222 is aligned with a direction of water flow. As water flows through the inlet 110 to the outlet 114 (FIG. 1), the velocity of the water (e.g., a speed of the water along the axis 252 (e.g., a horizontal axis) between the inlet 110 and the outlet 114) changes based on a cross-sectional area of the inlet 110 and a cross-sectional area of the outlet 114 (e.g., $\Delta v = v_{outlet} - v_{inlet}$, where $v_{outlet}$ is the velocity of the water at the outlet 114 and $v_{inlet}$ is the velocity of the water at the inlet 110). The hydrokinetic turbine assembly 100 employs Bernoulli's principles and the Venturi effect as will be understood by one of ordinary skill in the art to affect a velocity of fluid flow between the inlet 110 and the outlet 114. For example, water flows at an increased velocity through smaller diameters. Thus, the change in velocity Δv of the water flowing from the inlet 110 to the outlet 114 is a function of the inlet diameter 112 and the outlet diameter 116. In the example hydrokinetic turbine assembly 100, the inlet diameter 112 and the outlet diameter 116 are sized to increase the velocity of the water across the intake vanes 204 and to slow the velocity of the water as the water flows across the fixed vanes 240 to the outlet 114. Reducing the water velocity at the outlet 114 reduces, for example, turbulence of the water and increases efficiency and power output of the hydrokinetic turbine assembly 100.

As the water flows from the inlet 110 to the outlet 114, the intake vanes 204 pre-swirl the incoming water to a predetermined degree of swirl based on the geometry (e.g., angle of attack, angle orientation relative to horizontal, etc.) of the intake vanes 204. For example, design properties or geometries of the intake vanes 204 such as a shape of the individual vanes or blades, a degree of curvature of the vanes (e.g., twist), a width of the vanes, a thickness of the vanes, a number of the vanes, and an amount of spacing between the vanes can affect the flow pattern of the water moving into and through the hydrokinetic turbine assembly 100. As a result, the intake vanes 204 reduce variations in the water flow and orient the water by creating a substantially uniform flow (e.g., as a rotating vortex), thereby reducing flow resistance and turbulence. Thus, pre-swirling the water to substantially eliminate or reduce turbulence in the water before the water encounters the generator 104 (e.g., the rotor 222 and/or the fixed vanes 240) increases the efficiency of the operation of the generator 104 in capturing hydrodynamic power.

As the water flows past the intake vanes 204, the water impinges or impacts the vanes 236 of the rotor 222. The shaft 244 enables the rotor 222 to rotate about the axis 252 relative to the stator 224 to generate electric power. The shaft is configured to react a draft torque imparted by the bearings 245a and/or 245b when the vanes 246 rotate about the axis 252. Similar to the geometric design characteristics of the intake vanes 204, geometric design properties of the vanes 226 of the rotor 222 include angle of attack, blade shape, curvature, size, number, etc., to increase an efficiency of the hydrokinetic turbine assembly 100. Additionally, the fixed vanes 240 reduce a velocity of the water prior to the fluid flowing through the outlet 114. For example, the fixed vanes 240 are angled, slanted, tilted and/or have an airfoil cross-section configured to influence water flow pattern into a motion similar in direction of spin of the intake vanes 204 to reduce flow resistance and turbulence as the water moves toward the outlet 114, which results in increased efficiency and power output of the hydrokinetic turbine assembly 100.

Figure 3:
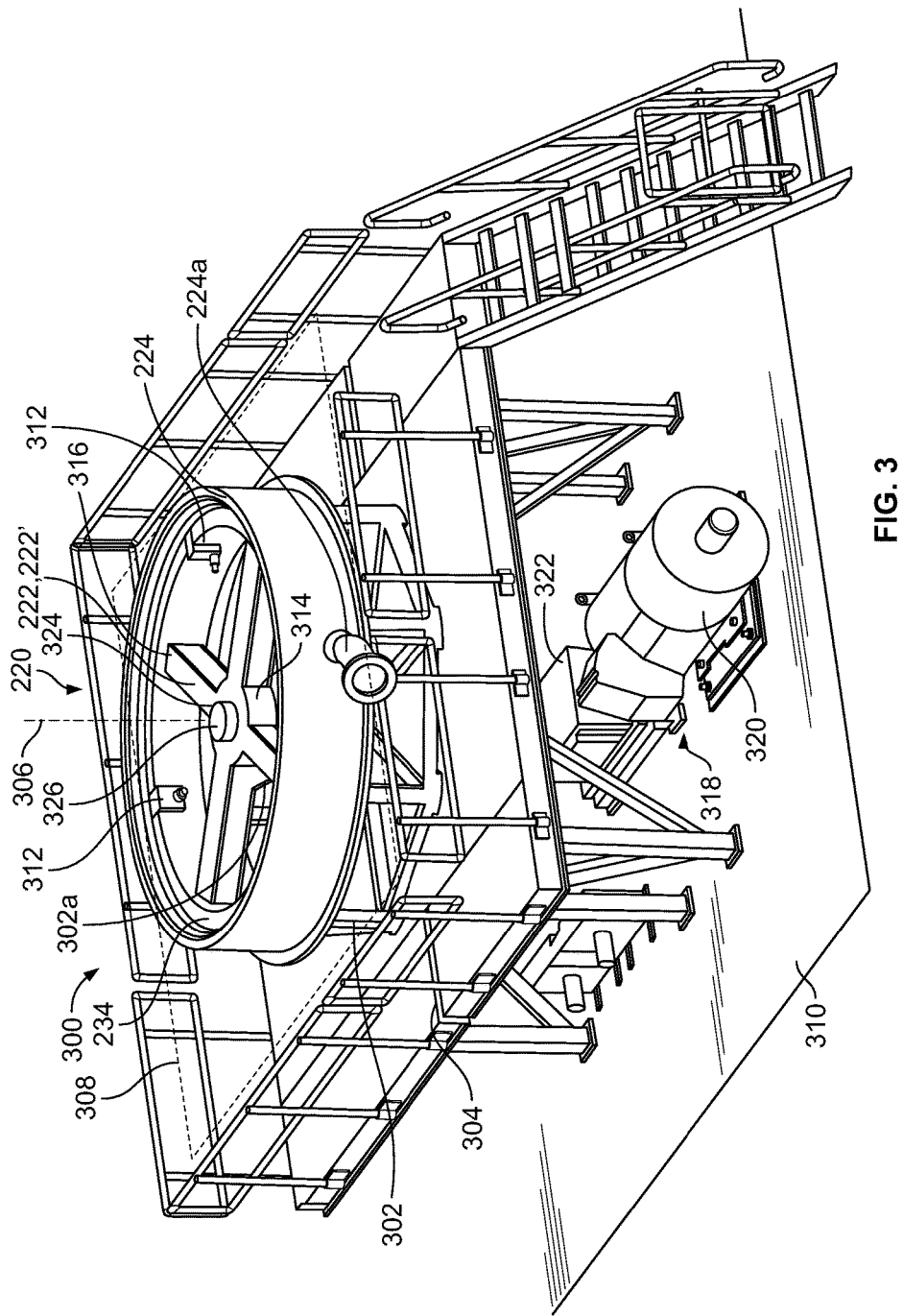
FIG. 3 is an example testing station to test a generator of the example hydrokinetic turbine of FIGS. 1 and 2.

FIG. 3 illustrates an example testing apparatus 300 to test a performance output of the rim generator 220 of the example hydrokinetic turbine assembly 100. In particular, the example testing apparatus 300 enables performance testing of the rim generator 220 to verify that an output (e.g., power output or electrical output) of the rim generator 220 meets performance requirements prior to assembling the rim generator 220 with the hydrokinetic turbine assembly 100 (e.g., the turbine 102, the shroud 106, the generator housing 214 and/or other components of the hydrokinetic turbine assembly 100.)

The example testing apparatus 300 of FIG. 3 includes a platform 302 to support the rim generator 220 (e.g., the support ring or rim 234, the rotor 222, the stator 224, etc.). More specifically, the platform 302 defines a horizontal platform that is supported by a frame 304. The platform 302 enables an axis of rotation 306 (e.g., a central axis or a longitudinal axis) of the rim generator 220 (e.g., the support ring or rim 234) to be positioned in a substantially vertical orientation (e.g., within five degrees of vertical). For example, the axis of rotation 306 is positioned substantially vertical relative to a plane 308 (e.g., a horizontal plane) of the platform 302 and/or the ground 310.

In the illustrated example, only the rim 234 and the stator 224 of the rim generator 220 are positioned on the platform 302. In particular, the rim 234 is coupled or fixed to a test rotor 222' (e.g., a blank rotor) via clamps 312. The test rotor 222' has a similar dimensional envelope as the rotor 222 of FIG. 2. For example, the test rotor 222' has a hub 314 and vanes 316 with the same dimensions as the hub 230 and the vanes 226 to emulate the hub 230 and the vanes 226 of the rotor 222 of FIG. 2. In this manner, the rim 234, which supports the magnets or magnetic material 236, may be tested with the stator 224 without having to include the vanes 226 and the hub 230. Thus, because the test rotor 222' is a replica of the rotor 222, the test rotor 222' is referred to as and/or is interchangeable with the rotor 222 in connection with FIGS. 3-6. Thus, in the illustrated example, only the rim 236 of the rotor 222 and the stator 224 of the rim generator 220 of FIG. 2 are coupled to the testing apparatus 300. However, in other examples, the rotor 222 (e.g., the vanes 226, the hub 230 and the rim 234) may be positioned on the testing apparatus 300 to test the rim generator 220. In other words, instead of the test rotor 222', the vanes 226, the hub 230, the rim 234 and/or other components of the rotor 222 of FIG. 2 may be assembled with the stator 224 and used with the testing apparatus 300 of FIG. 3 instead of the test rotor 222'.

To drive the rim generator 220, the testing apparatus 300 of the illustrated example includes a drive system 318. The drive system 318 of the illustrated example includes a motor 320 operatively coupled to the rim generator 220 via a transmission 322 (e.g., a gear box). More specifically, the transmission 322 of the illustrated example includes a shaft 324 that extends through an opening 302a of the platform 302 to operatively couple the motor 320 to the rotor 222 (i.e., the test rotor 222') of the rim generator 220. For example, an output shaft of the motor 320 may include a gear (e.g., a bevel gear) that couples to a gear (e.g., a bevel gear) positioned on an end of the shaft 324 opposite an end 326. In some examples, the shaft 324 may be the shaft 244 of the hydrokinetic turbine assembly 100. During testing, the motor 320 may be configured to provide a torque or speed output similar to an optimal speed and/or torque provided to the intake vanes 204 of the turbine 102 by an optimal water flow of an operational environment. In some examples, the motor 314 may output a maximum speed and/or torque that the rim generator 220 may experience in operational environments. During testing, the motor 320 rotates the shaft 324 coupled to the test rotor 222' via the transmission 322. In turn, the test rotor 222' rotates the rim 234 relative to the stator 224 to generate a power or electrical energy that is measured via the electrical output connector 224a. The vertical test indicates the actual energy generation performance of the as-built turbine components involved in the test, allowing determination as to whether the as-built turbine components are acceptable for installation.

By vertically orientating the axis of rotation 306 of the rim generator 220 relative to the horizontal plane 308, the example testing apparatus 300 isolates performance of the rim generator 220 from mechanical loses that may otherwise occur when testing the hydrokinetic turbine assembly 100 in a fully assembled condition or state as noted above. In other words, vertically orientating the axis of rotation 306 of the rim generator 220 eliminates or minimizes mechanical losses (e.g., due to, for example, shaft sag 248, the shaft bearings 245a-b, shaft seals, drive train components, etc.) when conducting a performance test of the rim generator 220. Eliminating or minimizing these mechanical losses more accurately reflects loads that may be imparted to the rim generator 220 or, more generally, to the hydrokinetic turbine assembly 100 when the hydrokinetic turbine assembly 100 is in an operational environment (e.g., submerged in water). Thus, sizing and/or material selection of the shaft 244, the bearings 245a-b, seals, drive train components and/or other components of the hydrokinetic turbine assembly 100 may be manufactured having smaller sizes and/or may be manufactured using less expensive materials compared to sizing and/or material selection requirements when testing the hydrokinetic turbine assembly 100 using conventional testing techniques (e.g., a fully assembled hydrokinetic turbine assembly).

Further, by vertically orientating the shaft 244 of the rim generator 220 and minimizing mechanical losses during performance testing, the example testing apparatus 300 enables shaft shag emulation (e.g., a distance the shaft 244 sags between first and second ends 244a and 244b when the first end 244a is coupled to the intake vanes 204 and the second end 244b is coupled to the rim generator 220 due to, for example, gravity and weight of components of the hydrokinetic turbine assembly 100). In this manner, a performance output of the rim generator 220 may be measured or tested using various shaft sag values to determine an optimal diameter for the shaft 244. For example, shaft sag induces an imbalance (e.g., a rotational imbalance) that can affect a performance output or efficiency of the rim generator 220. Thus, if shaft sag emulation provides a performance output of the rim generator 220 within a performance testing threshold (e.g., within performance testing requirements), a shaft having a diameter size and/or material selection that provides the particular shaft sag emulation may be used to manufacture the shaft 244 of the hydrokinetic turbine assembly 100. If, on the other hand, shaft sag emulation (e.g., provided by a particular shaft diameter and/or material selection) reduces the performance output or efficiency of the rim generator 220 below the threshold or performance requirements, a shaft size or diameter may be increased and/or the shaft may be manufactured using different material(s) (e.g., using carbon fiber instead of steel). In this manner, the shaft 244 may be manufactured using optimal parameters or characteristics (e.g., diameter, length, material selection, etc.) to achieve a desired output performance of the rim generator 220 and/or reduce manufacturing costs. Thus, the vertical test configuration enables the turbine components to be designed and tested for the actual operating environment (e.g. under water) rather than being unnecessarily larger, or structurally stronger, just for pre-installation verification of performance in an out-of-water horizontal test orientation or position.

FIG. 4 illustrates a plan view of the rim generator 220 positioned on the testing apparatus 300 without shaft sag emulation 400 of the shaft 244. The rim generator 220 may be positioned on the platform 302 such that at least one of a rotational axis 402 (e.g., a central axis or a longitudinal axis) of the rotor 222 or a longitudinal axis 404 (e.g., a central axis) of the stator 224 is vertically aligned relative to the plane 308 of the platform 302 and/or the ground 310 (FIG. 3). In this example, the rotational axis 402 of the rotor 222 is coaxially aligned with the longitudinal axis of the stator 224. Thus, in this configuration the rotational axis 402 and the longitudinal axis 404 are coaxially aligned, and the shaft 244 does not experience shaft sag. In this manner, the performance output of the rim generator 220 may be provided when the shaft 244 has substantially no shaft sag (e.g., zero shaft sag) to determine, for example, an optimal performance output. Further, in the illustrated example, the shaft 324 is fixed to the rotor 222 and the longitudinal axis 306 is coaxially aligned with the rotational axis 402 of the rotor 222. To test or measure a performance output of the rim generator 220, the rotor 222 is rotated relative to the stator 224 via the drive system 318.

FIG. 5 illustrates plane view of the rim generator 220 positioned on the testing apparatus 300 with shaft sag emulation 500 of the shaft 244. To emulate the shaft shag 248, the platform 302 of the illustrated example enables the stator 224 to be positioned or moved relative to the rotor 222. For example, the platform 302 enables the longitudinal axis 404 of the stator 224 to be offset relative to the rotational axis 402 of the rotor 222 by an offset distance 504. For example, the platform 302 includes a slider system 506 to enable movement of the stator 224 relative to the rotor 222 in at least one of a first direction 510 (e.g., an x-direction or a horizontal direction in the orientation of FIG. 5) or a second direction 514 (e.g., a y-direction or a vertical direction in the orientation of FIG. 5) different than the first direction 510. In this example, the slider system 506 includes a first slider 508 to enable the stator 224 to move relative to the rotor 222 in the first direction 510 and/or a second slider 512 to enable the stator 224 to move relative to the rotor 222 in the second direction 514 different than the first direction 510. By enabling the stator 224 to move relative to the rotor 222 in the first direction 510 and/or the second direction 514, the longitudinal axis 404 (e.g., a central axis) of the stator 224 may be moved or shifted relative to the rotational axis 402 (e.g., a central axis) of the rotor 222 by the offset distance 504. The offset distance 504 is representative of the shaft sag 248 that the shaft 244 may experience when the hydrokinetic turbine assembly 100 of FIGS. 1 and 2 is in a fully assembled state. For example, the shaft sag emulation 500 of FIG. 5 provides an offset distance 504 and/or shaft sag 248 that is approximately one-eighth of an inch. In some examples, the offset distance 504 is equal to the shaft sag 248. In some examples, a look-up table having empirical data may be employed to determine a shaft sag provided by the offset distance 504 when the offset distance 504 is not equal to the shaft sag 248. By reducing or eliminating the mechanical losses, shaft sag impact on the performance output (e.g., a power output) of the rim generator 220 can be measured or determined The measured performance output of the rim generator 220 provided by the shaft sag emulation 500 may be compared to the measured performance output of the rim generator 220 provided without shaft sag as shown in FIG. 4. In some examples, the comparison of the output performances may result in the shaft 244 configured to experience a particular amount of shaft sag in use (e.g., a particular diameter and/or material selection) to reduce manufacturing costs provided that the particular shaft sag results in the rim generator 220 satisfying performance requirements. Testing the hydrokinetic turbine assembly 100 in a fully assembled state, in contrast, does not allow for controlling or determining an output performance of the rim generator 220 based on an imbalance induced by shaft sag.

Figure 6:
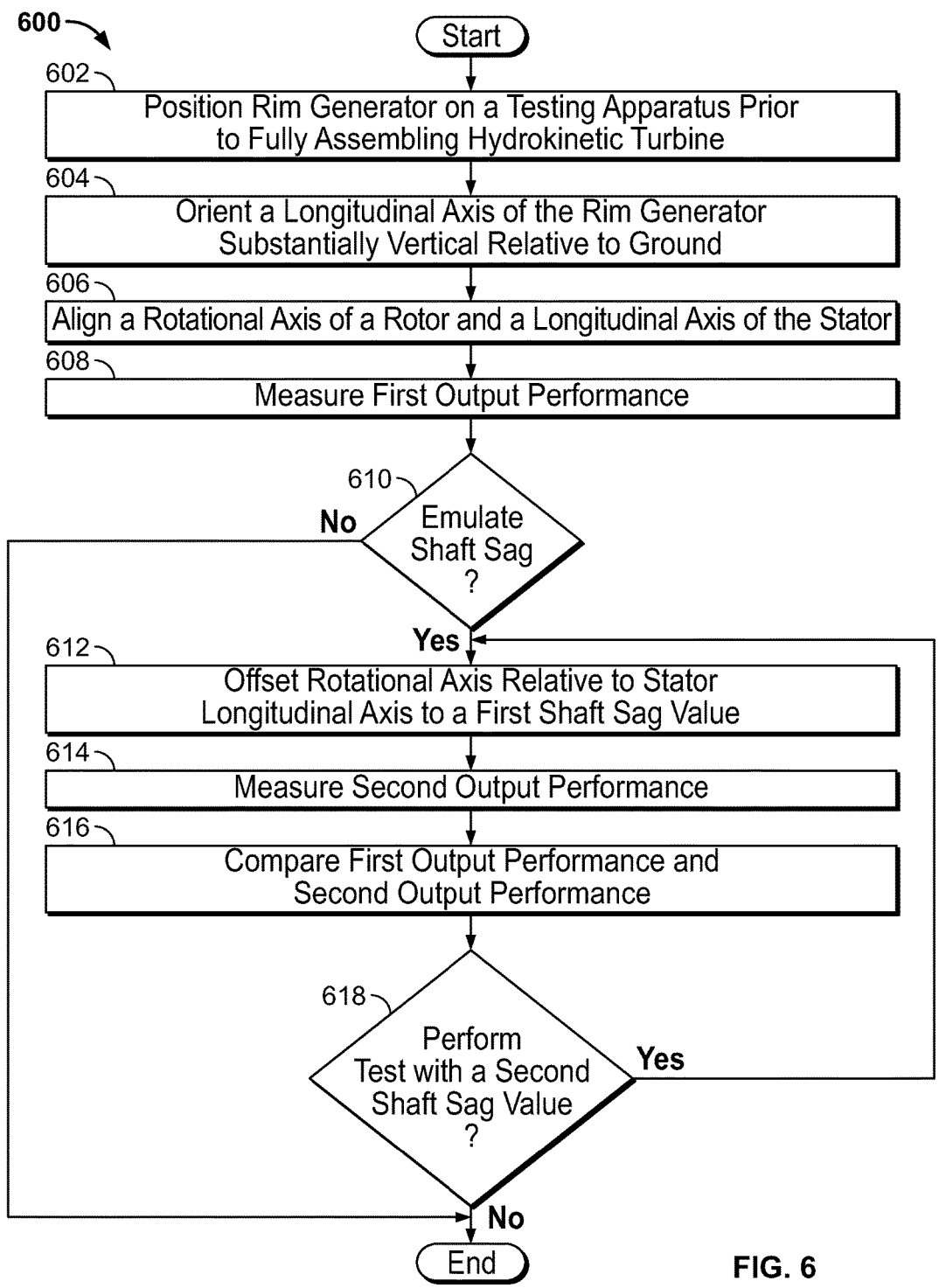
FIG. 6 is a flow diagram of an example method for testing the rim generator of the example hydrokinetic turbine of FIGS. 1-5.

FIG. 6 is a flow diagram of an example method 600 that may be used to test a performance output of a rim generator 220 such as the rim generator 220 of the example hydrokinetic turbine assembly 100 of FIGS. 1-5. While an example manner of testing the output performance of the rim generator 220 is illustrated in FIG. 6, one or more of the steps and/or processes illustrated in FIG. 6 may be combined, divided, re-arranged, omitted, eliminated and/or implemented in any other way. Further still, the example method 600 of FIG. 6 may include one or more processes and/or steps in addition to, or instead of, those illustrated in FIG. 6, and/or may include more than one of any or all of the illustrated processes and/or steps.

To begin the example assembly process of FIG. 6, a rim generator 220 is positioned on the platform 302 of the testing apparatus 300 (block 602). In particular, the rim generator 220 is positioned on the platform 302 such that a longitudinal axis 306 (e.g., an axis of rotation) of the rim generator 220 is oriented substantially vertically relative to a horizontal ground reference (block 604). With the rim generator 220 having the longitudinal axis 306 vertically oriented, the rotational axis 402 of the rotor 222 is aligned (e.g., coaxially aligned) relative to the longitudinal axis 404 of the stator 224 (block 606). A first output performance of the rim generator 220 is measured (block 608). For example, the motor 320 of the testing apparatus 300 is operated (e.g., turned on) to rotate the rotor 222 relative to the stator 224 via the shaft 324 and the transmission 322. A performance output such as, for example, an electrical power output (e.g., 800 watts) of the rim generator 220 is measured via the electrical connector 224a of the stator 224.

In some examples, shaft sag 248 may be emulated (block 610). If shaft sag emulation is not desired, then the method 600 ends. If shaft sag emulation is desired at block 610, then the rotational axis 402 of the rotor 222 is offset relative to the longitudinal axis 404 of the stator 224 (block 612). For example, the rotational axis 402 of the rotor 222 may be offset (e.g., by the offset distance 504) relative to the longitudinal axis 404 of the stator 224 via the slider system 506 (e.g., the first slider 508 and/or the second slider 512) of the platform 302. With the rotational axis 402 of the rotor 222 offset relative to the longitudinal axis 404 of the stator 224, a second output performance of the rim generator 220 is measured (block 614). For example, the motor 320 of the testing apparatus 300 is operated (e.g., turned on) to rotate the rotor 222 relative to the stator 224 via the shaft 324 and the transmission 322. In some examples, the first output performance is compared to the second output performance (block 616). For example, a difference between the first output performance and the second output performance may be used to determine a shaft sag effect on an efficiency or output performance of the rim generator 220. For example, the offset distance 504 representative of the shaft sag 248 may determine a reduction of efficiency of an output performance of the rim generator 220 compared to a shaft designed or configured to provide substantially no sag (i.e., when the rotational axis 402 of the rotor 222 is coaxially aligned with the longitudinal axis 404 of the stator 224 as shown in FIG. 4). If additional testing performance with different shaft sag is needed, the method 600 returns to block 612. If no additional testing performance is needed at block 618, the method 600 ends.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   positioning a rim generator of a hydrokinetic turbine assembly on a testing apparatus prior to assembling the rim generator with the hydrokinetic turbine;
   orienting a rotational axis of the rim generator substantially vertically when positioning the rim generator on the testing apparatus, the rim generator to rotate relative to the rotational axis to generate electrical power; and
   measuring a first output performance of the rim generator.

2. The method of claim 1, further comprising coaxially aligning a rotational axis of a rotor of the rim generator and a longitudinal axis of a stator of the rim generator when measuring the first output performance of the rim generator.

3. The method of claim 2, further comprising emulating shaft sag by offsetting the rotational axis of the rotor relative to the longitudinal axis of the stator.

4. The method of claim 3, further comprising measuring a second output performance of the rim generator when the longitudinal axis of the rotor is offset relative to the longitudinal axis of the stator.

5. The method of claim 4, further comprising comparing the first output performance and the second output performance to determine a reduction of output performance due to shaft sag.

6. The method of claim 3, wherein at least one of coaxially aligning or offsetting the longitudinal axis of the rotor relative to the longitudinal axis of the stator comprises moving the stator relative to the rotor via at least one of a first slider of the testing apparatus or a second slider of the testing apparatus.

7. A method comprising:
   orientating a longitudinal axis of a rim generator vertically relative to ground on a testing platform prior to assembling the rim generator with a hydrokinetic turbine assembly, the rim generator to rotate relative to the longitudinal axis to generate electrical power;
   driving the rim generator via a drive system; and
   measuring a first output performance of the rim generator.

8. The method of claim 7, wherein orientating the longitudinal axis of the rim generator comprises positioning the rim generator on a platform having a horizontal plane that is substantially parallel relative to ground.

9. The method of claim 7, wherein orientating the longitudinal axis of the rim generator comprises vertically orientating a longitudinal axis of a rotor of the rim generator.

10. The method of claim 9, further comprising driving the rotor relative to a stator of the rim generator to measure the first output performance of the rim generator.

11. The method of claim 9, wherein orientating the longitudinal axis of the rim generator comprises vertically orientating a longitudinal axis of a stator of the rim generator.

12. The method of claim 11, further comprising coaxially aligning the longitudinal axis of the rotor of the rim generator and the longitudinal axis of the stator of the rim generator and driving the rotor relative to the stator to measure the first output performance of the rim generator.

13. The method of claim 11, further comprising offsetting the longitudinal axis of the rotor relative to the longitudinal axis of the stator in at least one of a first direction or a second direction.

14. The method of claim 13, further comprising measuring a second output performance of the rim generator when the longitudinal axis of the rotor is offset relative to the longitudinal axis of the stator in the at least one of the first direction or the second direction to emulate shaft sag.

15. The method of claim 14, further comprising comparing the first output performance and the second output performance to determine an efficiency reduction due to the shaft sag.

16. A method comprising:
 positioning a rim generator on a platform of a testing apparatus such that a longitudinal axis of a rotor of the rim generator and a longitudinal axis of a stator of the rim generator are oriented vertically relative to the platform when the rim generator is supported by the platform;
 coupling a shaft to the rotor via an opening in the platform;
 moving the longitudinal axis of the rotor relative to the longitudinal axis of the stator via a slider system of the platform;
 rotating the rotor relative to the stator via a drive system and the shaft; and
 measuring a first output performance of the rim generator.

17. The method of claim 16, further comprising coaxially aligning the longitudinal axis of the rotor relative to the longitudinal axis of the stator via the slider system when measuring the first output performance of the rim generator.

18. The method of claim 16, further comprising offsetting the longitudinal axis of the rotor relative to the longitudinal axis of the stator via the slider system.

19. The method of claim 18, wherein offsetting the longitudinal axis of the rotor relative to the longitudinal axis of the stator via the slider system comprises moving the stator via a first slider in a first direction and moving the stator via a second slider in a second direction different than the first direction to emulate shaft sag.

20. The method of claim 19, further comprising measuring a second output performance of the rim generator when the longitudinal axis of the rotor is offset relative to the longitudinal axis of the stator.

21. The method of claim 20, further comprising comparing the first output performance and the second output performance to determine an effect of shaft sag on an efficiency of the rim generator.

\* \* \* \* \*